US008059861B2

(12) United States Patent
Li et al.

(10) Patent No.: US 8,059,861 B2
(45) Date of Patent: Nov. 15, 2011

(54) METHOD AND SYSTEM FOR IDENTIFYING AND RECOGNIZING PRODUCTS FOR SORTING/SEQUENCING OPERATIONS

(75) Inventors: Bing Li, Owego, NY (US); Daniel McHugh, New York, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 310 days.

(21) Appl. No.: 12/272,246

(22) Filed: Nov. 17, 2008

(65) Prior Publication Data

US 2010/0122943 A1 May 20, 2010

(51) Int. Cl.
*G06K 9/00* (2006.01)

(52) U.S. Cl. ........................................ 382/101; 209/584

(58) Field of Classification Search .................. 382/101, 382/102, 199; 209/583, 584
See application file for complete search history.

(56) References Cited

U.S. PATENT DOCUMENTS

| | | | | |
|---|---|---|---|---|
| 5,644,656 A | | 7/1997 | Akra et al. | 382/215 |
| 6,078,678 A | * | 6/2000 | Gavrilos | 382/101 |
| 6,446,099 B1 | | 9/2002 | Peairs | 707/517 |
| 6,813,541 B2 | | 11/2004 | Schlegel | 700/224 |
| 6,888,084 B1 | | 5/2005 | Bayer | 209/584 |
| 6,909,789 B1 | | 6/2005 | Hänsel et al. | 382/101 |
| 6,947,574 B1 | | 9/2005 | Graulich et al. | 382/101 |
| 7,161,108 B2 | | 1/2007 | O'Connell et al. | 209/584 |
| 7,258,277 B2 | | 8/2007 | Baker et al. | 235/385 |
| 7,356,162 B2 | | 4/2008 | Caillon | 382/101 |
| 2002/0029202 A1 | | 3/2002 | Lopez | 705/406 |
| 2005/0063590 A1 | | 3/2005 | Simon et al. | 382/181 |
| 2005/0123170 A1 | | 6/2005 | Desprez et al. | 382/101 |
| 2005/0135708 A1 | | 6/2005 | Joyce | 382/306 |
| 2007/0129957 A1 | | 6/2007 | Elliott et al. | 705/1 |
| 2007/0215529 A1 | | 9/2007 | Desprez et al. | 209/584 |
| 2008/0170747 A1 | * | 7/2008 | Dilanchian | 382/101 |
| 2009/0026117 A1 | * | 1/2009 | Paetsch et al. | 209/584 |

FOREIGN PATENT DOCUMENTS

| | | | | |
|---|---|---|---|---|
| DE | 40 00 603 | A1 | | 7/1991 |
| EP | 1 671 708 | A2 | | 6/2006 |
| WO | WO 2006/037413 | A1 | * | 4/2006 |
| WO | WO2007/048564 | A1 | | 5/2007 |

* cited by examiner

*Primary Examiner* — Andrew W Johns

(74) *Attorney, Agent, or Firm* — Leland Schultz; Andrew M. Calderon; Roberts Mlotkowski Safran & Cole, P.C.

(57) ABSTRACT

A method and system is provided for identifying and recognizing products such as mail pieces and, more particularly, a method and system of object recognition based mail piece fingerprinting is provided to be used with sorting and/or sequencing processes. The system for identifying product transported through a machine includes a first system configured to extract one or more unique features from each of a plurality of product and a data storage system configured to store the extracted one or more unique features for each of the plurality of product. The system further includes a second system configured to identify each of the plurality of product by matching the stored extracted one or more unique features with subsequently extracted unique features from each of the plurality of product as the plurality of product continue to be conveyed through a transportation system.

27 Claims, 4 Drawing Sheets

METHOD AND SYSTEM FOR IDENTIFYING AND RECOGNIZING PRODUCTS FOR SORTING/SEQUENCING OPERATIONS

FIELD OF THE INVENTION

The invention generally relates to a method and system for identifying and recognizing products such as mail pieces and, more particularly, to a method and system of object recognition based mail piece fingerprinting used with sorting and/or sequencing processes.

BACKGROUND DESCRIPTION

The sorting of mail is a very complex, time-consuming task. In general, the sorting of mail is processed through many stages, including front end and back end processes. For example, and as discussed in further detail below, these processes include reading delivery information, and sorting and/or sequencing the mail in delivery order sequence. These processes can either be manual or automated, depending on the mail sorting facility, the type of mail being sorted such as packages, flats, letters and the like. A host of other factors may also contribute to the automation of the mail sorting, from budgetary concerns to modernization initiatives to access to appropriate technologies to a host of other factors.

Also, the delivery of mail is known to be critical to commerce and the underlying economy. It is thus critical to commerce and the underlying economy to provide efficient delivery of such mail in both a cost effective and time efficient manner. This includes, for example, reading delivery destination information from the mail, and arranging the randomly deposited mail into a sequential delivery order for delivery to a destination point based on the destination information.

In current sorting processes, optical character recognition (OCR) systems may be used to capture destination information. These optical character recognition systems read, for example, the destination information of the mail pieces. A bar code is then assigned to the destination information of the mail pieces. The bar code (tag) is used as a mail piece identification that can be used to identify the mail piece in the mail stream. This process alters the original mail piece and requires both a bar code printer and reader, which adds operational expense in that printers and readers have to be purchased and maintained by the facility. Although additional machinery is needed, in current systems the use of bar codes is advantageous in that it allows rapid and accurate reading of the mail pieces to be performed thus increasing the overall efficiencies of the sorting and/or sequencing processes.

Although OCR processes have reached a relatively high level of sophistication in order to accommodate hand-written indicia as well as many different fonts of many different or even varying sizes, it certain instances, the delivery destination information cannot be read accurately by the OCR. In these cases, it is not possible to put a bar code on the mail pieces until such information is resolved. This, of course, takes additional processing time which effectively slows the sorting and/or sequencing of the mail pieces. For example, in the case that the destination information cannot be resolved, the captured information is sent to an operator. The operator has to read the destination information, key in the correct destination information and send it back to the processing facility. Once the processing facility receives the destination information, the bar code printer can then tag the mail piece with a bar code.

As another issue, the amount of information which can be encoded in a bar code or similar machine-readable indicia may often be limited. Additionally, bar code or machine-readable indicia are subject to sources of error such as being performed in response to a possibly erroneous optical character recognition process or incorrect bar codes being applied by a sender which do not correspond to the written address. Moreover, bar code or machine readable indicia may not be applied to all articles subjected to the automated process.

The invention is designed to overcome one or more of the above problems.

SUMMARY OF THE INVENTION

In a first aspect of the invention, a system for identifying product transported through a machine comprises a first system configured to extract one or more unique features from each of a plurality of product and a data storage system configured to store the extracted one or more unique features for each of the plurality of product. The system further comprises a second system configured to identify each of the plurality of product by matching the stored extracted one or more unique features with subsequently extracted unique features from each of the plurality of product as the plurality of product continue to be conveyed through a transportation system.

In another aspect of the invention, a computer program product comprises a computer usable storage medium having readable program code tangibly embodied in the storage medium. The computer program product being operable to: extract one or more unique features for each of a plurality of product prior to during induction of the plurality of product into a system and during processing of the plurality of product in the system; compare the extracted one or more unique features for each of the plurality of product prior to or during induction with the extracted one or more unique features during processing of the plurality of product in the system; and identify each of the product based on a match in the comparing.

In another aspect of the invention, a method of sorting mail using extracted features comprises: extracting information from a plurality of mail piece prior to or during induction of the mail piece into a sorting and/or sequencing system using edge recognition techniques; storing the extracted information from the plurality of mail piece in a data storage system; extracting the information from the plurality of mail pieces as they are being transported through the sorting and/or sequencing system using the edge recognition techniques; comparing the stored extracted information with the extracted information extracted during the transport through the sorting and/or sequencing system; identifying matches between the stored extracted information with the extracted information extracted during the transport through the sorting and/or sequencing system; and sorting the mail pieces that have been matched.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to a method and system for identifying and recognizing products such as mail pieces and, more particularly, to a method and system of object recognition based mail piece fingerprinting used with sorting and/or sequencing processes. The system and method of the present invention is well adapted to extracting information (e.g., characters or other features) from mail pieces in order to sort and/or sequence the mail pieces to a destination order. The mail pieces can be, for example, flats, parcels, packages and other mail items (i.e., letters) for future delivery or warehousing or the like. Advantageously, the invention significantly reduces machine costs by reducing material handling equipment such as, for example, eliminating the need for bar code printers and bar code readers, while improving overall sequencing throughput. The system and method of the present invention also eliminates a source of error and is configured to extract any type of identifying mail piece information, thereby eliminating the need to resolve handwriting which is not capable of being read. The system of the invention is modular, in nature, and can be implemented across different machines, over several machines and, in embodiments, can be retrofitted to preexisting machine configurations. Other applications such as warehousing and storage applications are also contemplated for use with the invention.

In embodiments, the present invention is configured to extract identifying marks (features) from mail pieces (or other types of product or objects) for use in future sorting and/or sequencing processes (or warehousing). The identifying marks can be any unique characteristic on the mail piece (or other types of product or objects) such as, for example, written characters or other identifying marks. In embodiments, the characters or other identifying marks are detected using zero crossing edge detection methodologies. More specifically, the characters or other identifying marks are detected using zero-crossing object recognition based mail piece fingerprint representation. These characters or other identifying marks will be bound and features thereof will be extracted and stored in a database. The extracted features will be used to identify the mail piece as it is conveyed throughout the system for the purposes, in embodiments, of sorting and/or sequencing of mail pieces. The use of such methodologies reduces the cost of mail piece tagging using a bar code printer and significantly reduces error rates associated with bar coding techniques.

Exemplary System Environment and Infrastructure

Figure 1:
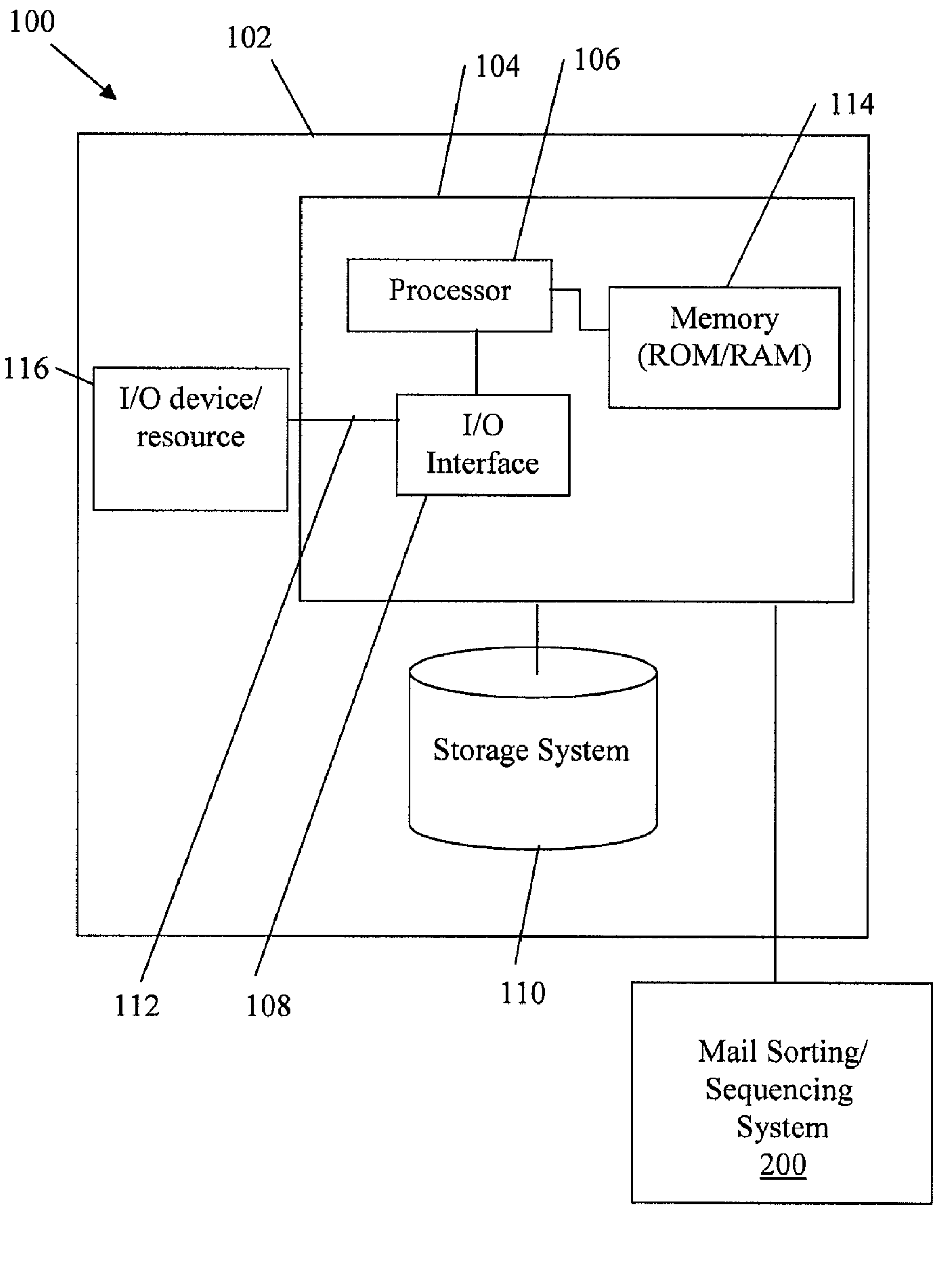
FIG. 1 shows an illustrative environment for implementing processes in accordance with the present invention.

FIG. 1 shows an exemplary computer system environment 100 for implementing the system and methods in accordance with the invention. As shown in FIG. 1, the exemplary computer system environment 100 includes a computer infrastructure 102 that is operable to perform the processes described herein using a computing device 104. The computer infrastructure 102 and/or computing device 104 can be, for example, one or more servers that are accessible by different computing devices throughout a facility or remotely from the facility.

In embodiments, the computer infrastructure 102 is configured to be a Management System (Controller) for a mail sorting and sequencing system 200. In this capacity, the Management System controls and coordinates all system operations and maintains the identity of all mail pieces (or other objects, products, etc.). For example, the Management System is configured to control and schedule all system movements, keep track of all mail piece (or other objects, products, etc.) identification by position, extract, compare and identify mail pieces based on edge features, act as an interface between subsystems, etc. The Management System can also include known algorithms to sort/sequence the mail pieces using the system and methods of the present invention.

The computing device 104 includes a processor 106, input/output (I/O) interface 108, a memory 110, and a bus 112. The bus 112 provides a communications link between each of the components in the computing device 104. The computing device 104 can communicate with other computing devices or components of the mail sorting and sequencing system 200 by a wired or wireless link such as, for example, a LAN, WAN, intranet or the Internet. In embodiments, the mail sorting and sequencing system 200 includes components to sort and/or sequence the mail pieces (or other objects, products, etc.) as discussed in more detail with reference to FIG. 2.

By way of example, the mail sorting and sequencing system 200 includes one or more input devices. The input devices can be mail piece feeders such as, for example, letter feeders and flat feeders of any conventional configuration, well known to those of skill in the art. In embodiments, the input devices include optical character recognition systems which are designed to read destination information from the mail pieces, as well as other unique characteristics, e.g., edge features, which can be extracted and used for identifying the mail pieces throughout the system. Advantageously, by using the optical character recognition systems to obtain edge feature information of the mail pieces, as discussed in further detail below, it is now possible to eliminate bar code printers and bar code readers, thereby reducing overall machine costs and sources of errors. In fact, in implementation, the entire mail sorting and sequencing system 200 can be conspicuously devoid of bar code printers or bar code readers.

Still referring to FIG. 1, the computer system environment 100 includes a storage system 110, e.g., database. While only a single storage system 110 is shown, it should be understood that the computer infrastructure 102 may include any number of storage systems 110, either external or internal to the computing device 104. As such, it should be understood that the storage system 110 may include one or more local storage systems. The one or more storage systems 110 store information such as sorting and/or sequencing schemes, mail piece position, dock management information, control of different subcomponents of the system 200, maintenance information, as well as extracted edge data features of mail pieces for comparison, identification and sort/sequencing.

In embodiments, the edge data features include, for example, fast features such as height, width, minimum line fitting error and maximum line fitting error. The extracted edge data features, in turn, are used to create a fingerprint (e.g., signature) of each mail piece used to identify the mail pieces during a sorting and/or sequencing process. As should be understood, the use of the edge data features eliminates the need to place any indicia or marking on the mail pieces such as, for example, bar codes. This, in turn, eliminates the need for a bar code printer and a bar code reader. As a consequence, machine costs are significantly reduced and the overall efficiency of the sorting and/or sequencing process is significantly increased. For example, by implementing the system and methods of the present invention it is no longer necessary to mark and subsequently read bar codes from each mail piece, thus eliminating processing steps, in addition to eliminating a potential source of error.

Still referring to FIG. 1, the processor 104 executes computer program code processes on computer storage media, which may be stored in the memory 114 and/or storage system 110. The computer storage media may be, for example, a magnetic or optical portable disk, a hard drive, random access memory (RAM), read-only memory (ROM), an erasable programmable read-only memory, etc. to name a few. While executing computer program code, the processor 106 can read and/or write data to/from the memory 114, storage system 110, and/or I/O interface 108. The memory 114 may include, for example, local memory employed during actual execution of program code, bulk storage, and/or cache memories which provide temporary storage of at least some program code to reduce the number of times code must be retrieved from bulk storage during execution.

Further, the computing device 104 is in communication with an external I/O device/resource 116, which interacts with the computing device 104. In embodiments, the external I/O device/resource 116 may be, for example, a keyboard, one or more interfaces, one or more pointing devices, etc. In further embodiments, the external I/O device/resource 116 can be representative of one or more optical character recognition systems.

Exemplary Sorting and/or Sequencing System

Figure 2:
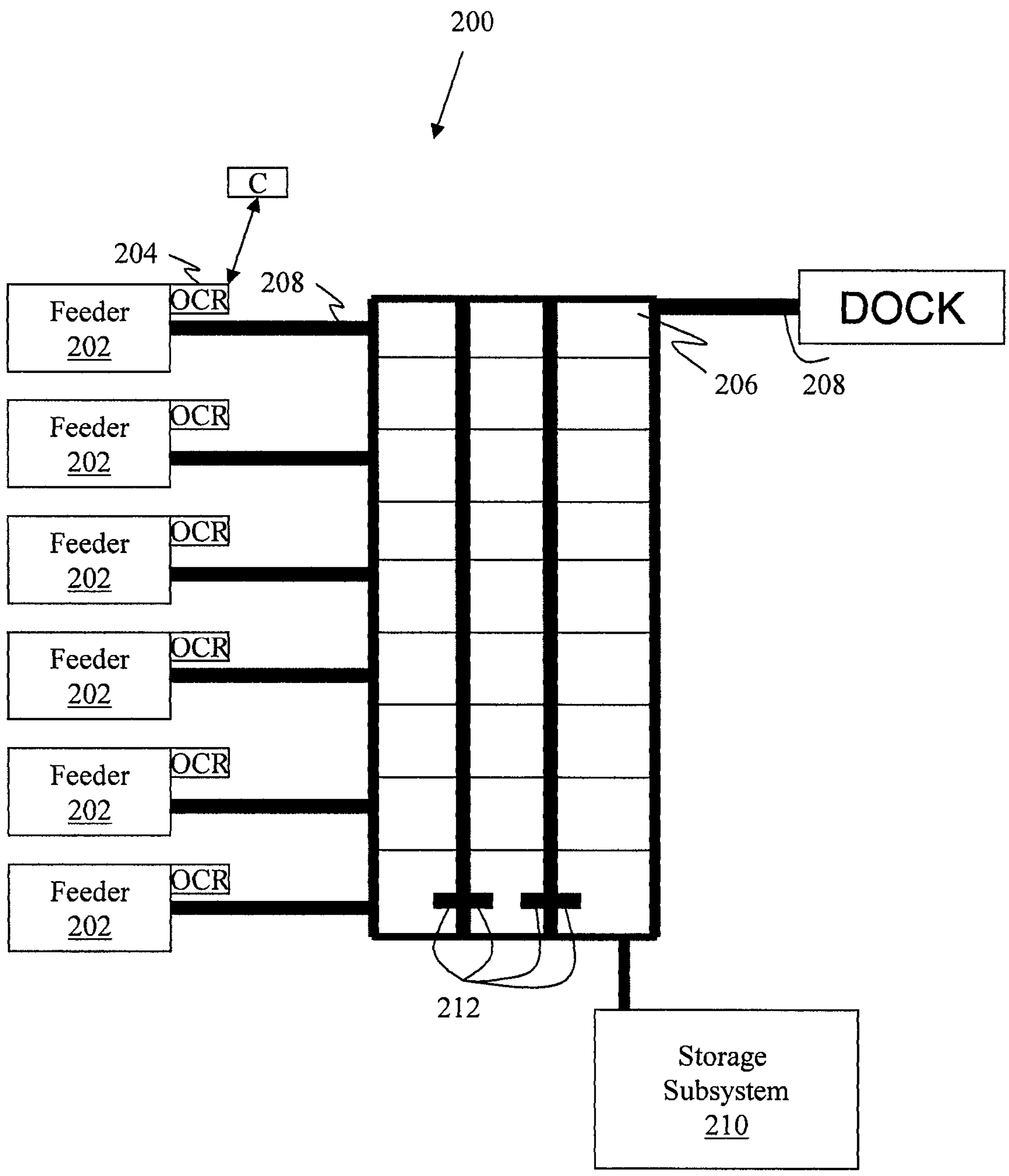
FIG. 2 shows an overview of the system in accordance with aspects of the present invention.

FIG. 2 shows an overview of the system in accordance with aspects of the invention. More specifically, FIG. 2 shows an overview of the mail sorting and sequencing system 200 in accordance with one aspect of the invention. It should be understood that the mail sorting and sequencing system 200 of FIG. 2 is merely illustrative of a system implementing the processes in accordance with the present invention. Accordingly, the components of the mail sorting and sequencing system 200 shown in FIG. 2 should not be considered a limiting feature of the present invention in that other components known to those of skill in the art can be used with the present invention. Additionally, as described above, the present invention can be retrofitted to any known existing mail sorting and/or sequencing system.

In aspects of the invention, the mail sorting and sequencing system 200 includes input devices 202 depicted as a series of mail piece feeders such as, for example, letter feeders, flat feeders and/or parcel feeders. Those of skill in the art will understand that one or more feeders 202 can be implemented with the present invention, in any combination of mail, letter or parcel configurations. The input devices 202 include an optical character recognition system 204. The character recognition system 204 is in communication with a controller "C", which is representative of, for example, the computing infrastructure of FIG. 1. In embodiments, the controller "C" includes one or more algorithms that calculate the output bin 206 associated with the input mail piece. Also, in embodiments, the optical character recognition system 204 can be located at other positions throughout the system.

In aspects of the invention, the character recognition system 202 will read information from the mail piece and provide such information to the computing device 104 of FIG. 1. This information includes destination information of the mail pieces, in addition to extracted edge information of identifying information of the mail piece which can later be used to identify the mail piece for sorting and/or sequencing processes, as discussed in more detail below.

A mechanical transporting system 208 conveys the mail pieces from the output of the feeders 202 into any of the output bins 206. The mechanical transporting system 208 can include numerous conveyors that transport the mail pieces internally through the system such as, for example, any conventional transportation system such as pinch belt conveyors. In embodiments, the mail pieces can also be inducted into holders that hang from a rail system and which are transported to an output bin 206 such as shown in U.S. Pat. No. 7,250,582, the contents of which are incorporated by reference herein by its entirety.

In embodiments, the mechanical transporting system 208 includes straight, curved, and ramped conveyors, and can be configured into many different shapes, e.g., an oval shape, a loop configuration, serpentine and the like, designed for certain flooring spaces. The mechanical transporting system 208, in embodiments, may also be configured in two or more stacked layers.

In further embodiments, the mail sorting and sequencing system 200 includes a storage subsystem 210 capable of storing mail pieces during any stage of the sorting and/or sequencing process. The storage subsystem 210 may also act as a storage area for rejected mail pieces, which are to be processed in the future (inducted back into the system). The storage subsystem 210 may be modular in nature, and sized to handle the volume of mail pieces from many different types and sizes of facilities.

The mail sorting and sequencing system 200 also includes a delivery container loader and/or packaging device 212. In embodiments, the container loader loads the mail pieces into containers at the speed of the mechanical transporting system 208. As those of skill in the art will appreciate, the container loader is configured to automatically load an empty container when a previous container is full. The packager is designed to package the mail pieces into groups according to their destination. Packagers and container loaders are well known in the art such that further explanation is not required herein for one of skill in the art to understand the invention. Additionally, the mechanical transporting system 208 can include a conveyor for moving the containers from the container loader (output bins 206) to the point of delivery (dock).

Although not specifically shown, the mail sorting and sequencing system 200 can also include additional components and systems such as, for example, an unpackaging subsystem, dispatch packaging system, and receipt packaging system. More specifically, the unpackaging subsystem removes mail pieces from the standard mail packages and puts the resultant mail into containers, directly into transportation vehicles, or delivery point packaging. The dispatch packaging system packages mail packages into containers for shipping to processing facilities without removing the individual mail piece container. The dispatch packaging system also packages mail packages into shipping containers, rolling stock or directly into transportation vehicles to other processing facilities without removing the individual mail piece container. The receipt packaging system unpacks standard mail packages from shipping containers, rolling stock, or directly for transportation vehicles from other processing facilities without removing the individual mail piece container.

Exemplary Processes

Figure 3:
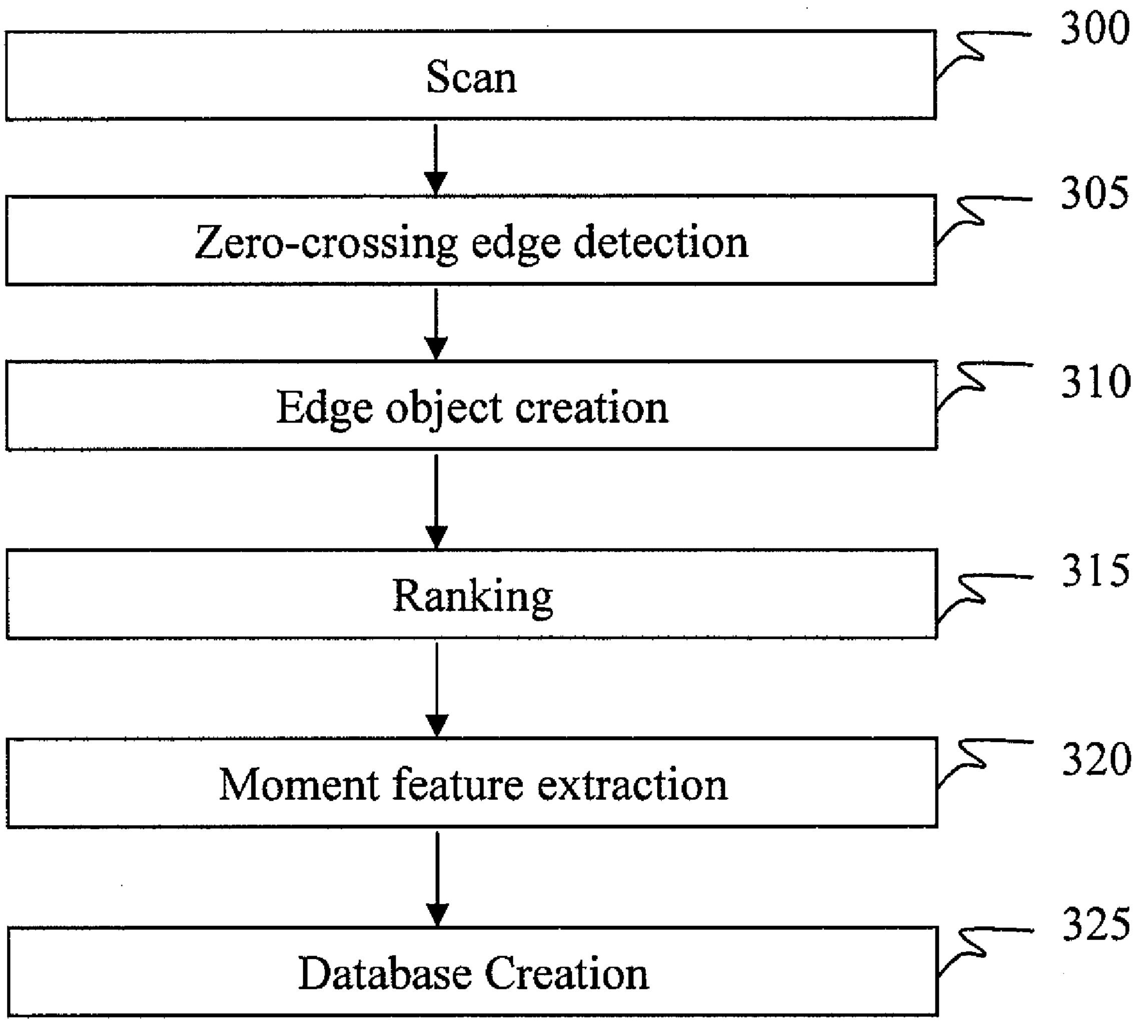
FIG. 3 shows a flow diagram implementing aspects according to the present invention.
Figure 4:
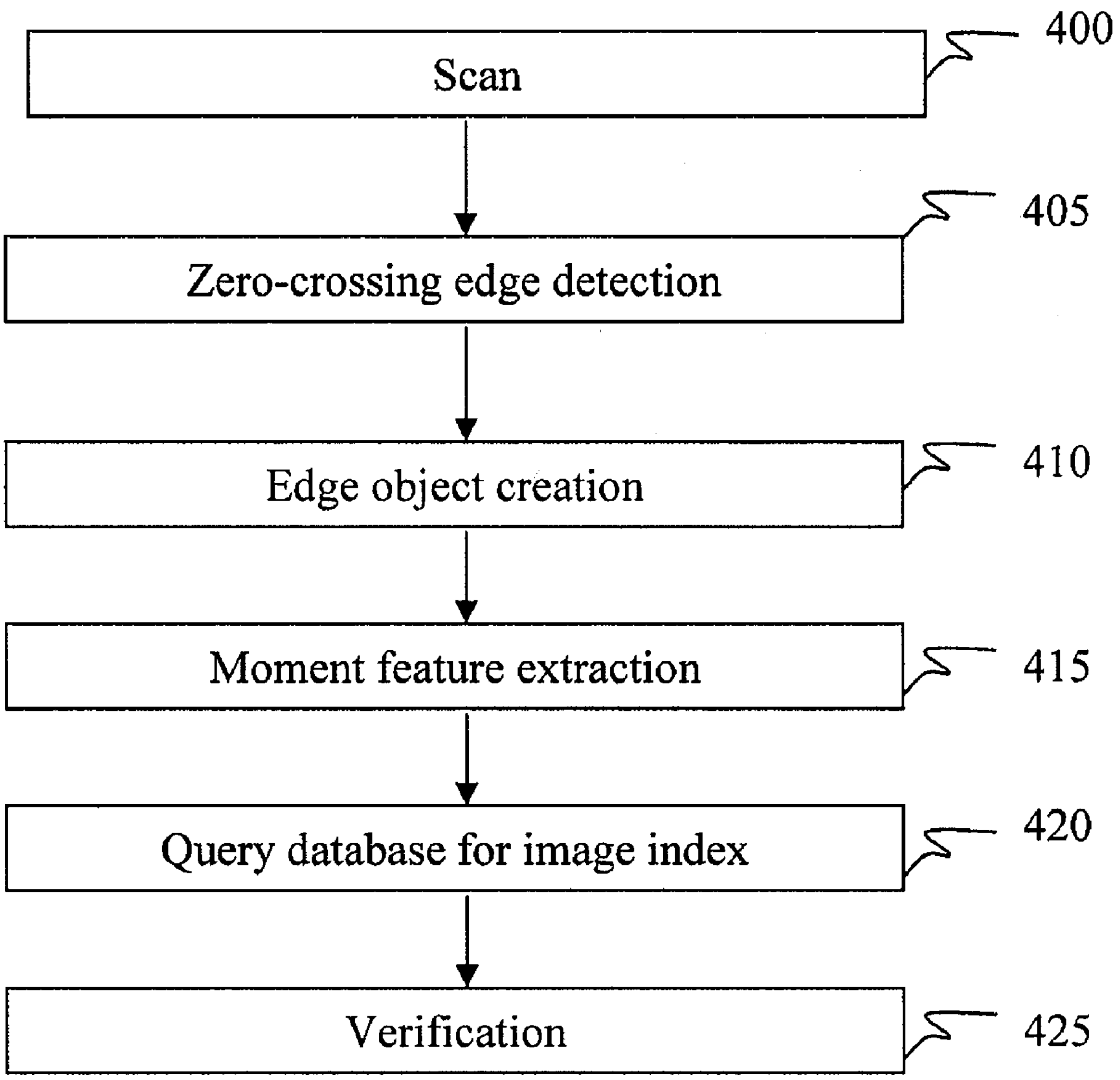
FIG. 4 shows a flow diagram implementing aspects according to the present invention.

FIGS. 3 and 4 are flow diagrams showing the steps implemented by the invention. The steps of the invention may be implemented on computer program code in combination with the appropriate hardware such as shown in FIG. 1. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation or other computer over the Internet or some other type of network. FIGS. 3 and 4 may equally represent a high-level block diagram of the system of the present invention, implementing the steps thereof.

In embodiments, the present invention is configured to use unique identifying marks (objects) on a mail piece for future mail piece sorting and/or sequencing processes. The identifying marks can be any unique object on the mail piece such as, for example, written characters or other identifying marks. In embodiments, the characters or other identifying marks are detected using zero crossing edge detection methodologies. Once the marks are identified, features can be extracted and saved in a database such as, for example, the storage system of FIG. 1. The extracted features will be unique to each mail piece such that querying the database, on subsequent scans, can provide an identification of such mail piece for sorting and/or sequencing processes.

More specifically, FIG. 3 shows a process of identifying and "cataloging" the mail pieces in accordance with aspects of the invention. At step 300, the OCR scans the mail piece for destination information as well as unique objects such as, for example, written characters. These written characters can be, for example, associated with the destination address, sender's address or any other mark on the mail piece that can be a unique identifying feature. The destination information can be used for preparing a sort scheme, whereas, the unique objects are utilized for future identification of the mail pieces in the sorting and/or sequencing system. This allows the sorting and/or sequencing system to process the mail without the need for bar codes or other indicia. The scanning can be prior to induction into the system, at induction into the system and/or after induction into the system.

At step 305, a zero-crossing edge detection methodology using for example, a pixel by pixel methodology, is implemented using the computing infrastructure of the present invention. In embodiments, the zero-crossing edge detection methodology advantageously guarantees connectedness by using a Laplacian of Gaussian (LoG) filtering as discussed below. Also, the zero-crossing edge detection methodology is invariant to linear imaging lighting change thereby making the methodology, e.g., recognition of the objects, very robust. The zero-crossing edge detection methodology is configured to detect an edge of an indemnifying mark on the mail piece.

At step 310, an edge of the object, e.g., written character or other identifying mark, can be created using the zero-crossing edge detection methodology. In one exemplary methodology, the edge detection can be provided by designing two Gaussian smooth filtering 3×3 pixel, 5×5 pixel and using the zero crossing of the difference of the two smooth filtering to generate object edges. In this example, the edge object creation can include generating all connected regions associated with the object in order to form bound edges (bounding a feature which is unique to the mail piece). The bound edges will create a unique identification mark for this mail piece.

Those of skill in the art will understand that other edge detection methodologies can also be implemented with the present invention and that the Gaussian smooth filtering methodology should not be considered a limiting feature of the present invention. Also, as should be understood, the present invention can implement a Laplacian of Gaussian (LoG) operation. Laplacian filters are derivative filters used to find areas of rapid change (edges) in images. Since filters are very sensitive to noise, it is common to smooth the image (e.g., using a Gaussian filter) before applying the Laplacian. This two-step process is called the Laplacian of Gaussian (LoG) operation.

In embodiments, the edge object is ranked at step 315. In this ranking process, the slope of the zero crossing is used to measure edge strength. Once the edge strength is measured, it can be ranked with respect to other edge measurements or a threshold value. And, in embodiments, edge objects with low strength can be considered noise objects and removed from the object list. In this way, fast filtering can be implemented to remove noise resulting in a more robust object recognition. The remaining objects can be considered signatures (identifying marks) of the mail piece.

At step 320, moment features are extracted from within the bound edges. The moment features can be captured using, for example, known extraction methodologies implemented on the computing infrastructure of FIG. 1. In embodiments, the extracted features can be global properties or local features of the bounded object (e.g., characters). In embodiments, the features can be described as shapes and are representative of the objects, e.g., characters or other unique identification marks on the mail piece.

At step 325, an edge object database is built. For example, for each edge object (e.g., extracted feature), the database can store the edge data with fast features representative of the identifying marks such as, for example, height, width, minimum line fitting error and maximum line fitting error. The edge object creation of the mail piece creates the fingerprint (signature) of the mail piece, which is used to identify the mail piece during sorting and/or sequencing processes. The processes of FIG. 3 will be repeated for each mail piece.

FIG. 4 shows a process for identifying the mail piece (for sorting and/or sequencing) in accordance with aspects of the invention. In embodiments, at step 400, the OCR scans the mail piece for objects such as, for example, written characters. The scanning occurs during the processing, e.g., transport, of the mail pieces through the system. As should be understood, this is a subsequent scanning process, with regard to that mentioned with reference to FIG. 3. At step 405, a zero-crossing edge detection methodology is provided using for example, a pixel by pixel methodology. As noted above, the zero-crossing edge detection methodology advantageously guarantees connectedness by using a Laplacian of Gaussian (LoG) filtering, and is invariant to linear imaging lighting change.

At step 410, an edge of the object, e.g., written character or other identifying mark, is created using the methodologies discussed herein. In one exemplary methodology, the edge detection can be provided by designing two Gaussian smooth filtering 3×3 pixel, 5×5 pixel and using the zero crossing of the difference of the two smooth filtering to generate object edges. In this non-limiting example, the edge objection creation can include generating all connected regions associated with the object.

At step 415, moment features are extracted from within the bound edges. The moment features can be extracted using, for example, known extraction methodologies as discussed above. The extracted features can be global properties or local features of the objects. In embodiments, the features can be described as shapes of the objects and are representative of the objects, e.g., characters or other unique identification marks on the mail piece.

At step 420, the edge object database is queried using the subsequently extracted features in order to identify the mail piece, e.g., compare the extracted feature of the current mail piece with previously extracted features identifying a known mail piece. For example, the database can be queried for pixel count, height, width and other moment features, depending on the required granularity. In embodiments, to reduce processing overhead, a course query can first be conducted in order to identify the mail piece. This course query can be, for example, a comparison of the shape of the bounded edges of the current mail piece to those already extracted and stored in the database. If the course query does not result in a match, finer granularity queries can be conducted. These finer granularity queries can include, for example, character by character or pixel by pixel comparisons.

At step 425, the identification of the mail piece is verified using different methodologies. The verification process is used to reduce identification errors. For example, the verification process can include the use of fitting errors to reject the objects, eigen vectors to determine orientation of objects and to normalize objects and/or a Voronoi diagram. As should be understood, in mathematics, a Voronoi diagram is a special kind of decomposition of a metric space determined by distances to a specified discrete set of objects in the space, e.g., by a discrete set of points. In embodiments, Hausdorff histograms and fast dilation methods can also be used to verify the matching. In embodiments, a Hausdorff histogram has been found to be more stable than using a Hausdorff distance. The processes of FIG. 4 will be repeated for each mail piece.

Example of Use

In embodiments, the identification of the mail pieces can be used in sorting and/or sequencing processes using any known algorithms. By way of an exemplary illustration, the mail pieces are feed through the one or more feeders. As the mail pieces are fed, the OCR will capture the destination information from the mail pieces, which are used to create a sorting scheme. The captured information is also used to identify the mail piece by using its unique characteristics. For example, edges of the unique characteristics of the mail piece will be created using a zero-crossing edge detection methodology. These unique characteristics (features) will be extracted and stored in a database, and later used to identify the mail piece as it is conveyed throughout the system. A filtering methodology can used to eliminate any noise.

As the mail piece is transported through the system, an OCR will read the information on the mail piece in order to identify the mail piece. For example, edges of characters of the mail piece will be created in order to create a unique characteristic, similar to that described with the creation of the database. The features are extracted and compared to the previously stored features in order to identify the mail piece. If the mail piece cannot be identified, it can be rejected and manually identified by an operator. If the mail piece is identified, it can be directed to a particular output bin for sorting and/or sequencing using known sorting/sequencing algorithms.

The foregoing examples have been provided for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A system for identifying product transported through a machine, comprising:

a first system configured to extract one or more unique features from each of a plurality of product;

a data storage system configured to store the extracted one or more unique features for each of the plurality of product; and a second system configured to identify each of the plurality of product by matching the stored extracted one or more unique features with subsequently extracted unique features from each of the plurality of product as the plurality of product continue to be conveyed through a transportation system.

2. The system of claim 1, wherein the extracted one or more unique features and the subsequently extracted unique features are edge information.

3. The system of claim 2, wherein:

the extracted one or more unique features are extracted by an optical character recognition system as each of the plurality of product is inducted into the transportation system; and the subsequently extracted unique features are extracted by the optical character recognition system as they are conveyed through the transportation system.

4. The system of claim 1, wherein the first system is an optical character recognition system and the second system is a computing management system for a sorting and/or sequencing machine.

5. The system of claim 4, wherein the computing management system includes a sort scheme for sorting and/or sequencing the plurality of product.

6. The system of claim 5, wherein the plurality of product is mail pieces.

7. The system of claim 1, wherein the second system is configured to extract the one or more unique features and the subsequently extracted unique features by detecting one or more edges of identifying marks using zero-crossing object recognition based mail piece fingerprint representation.

8. The system of claim 7, wherein the extracted one or more unique features and the subsequently extracted unique features are representative of same characters or other identifying marks detected using edge based recognition.

9. The system of claim 1, wherein the extracted one or more unique features and the subsequently extracted unique features are edge data features comprising at least one of height, width, minimum line fitting error and maximum line fitting error.

10. The system of claim 9, wherein the edge data features are used to create a fingerprint of each mail piece used to identify the mail pieces during a sorting and/or sequencing process.

11. The system of claim 1, wherein extracted one or more unique features and the subsequently extracted unique features are provided by zero-crossing edge detection using a Laplacian of Gaussian (LoG) filtering.

12. A computer program product comprising a computer usable storage medium having readable program code tangibly embodied in the storage medium, the computer program product being operable to:

extract one or more unique features for each of a plurality of product prior to induction of the plurality of product into a system and during processing of the plurality of product in the system;

compare the extracted one or more unique features for each of the plurality of product prior to or during induction with the extracted one or more unique features during processing of the plurality of product in the system; and identify each of the product based on a match in the comparing, wherein the computer usable storage medium is non-transitory computer useable medium.

13. The computer program product of claim 12, wherein the product is mail pieces.

14. The computer program product of claim 12, wherein the extracting comprises detecting edges of an identifying mark using Gaussian smooth filtering.

15. The computer program product of claim 14, wherein the extracting comprises ranking an strength of the detected edges.

16. The computer program product of claim 14, wherein the extracting comprises a Laplacian of Gaussian (LoG) operation.

17. The computer program product of claim 12, wherein the computer program product is operable to verify the identity of each of the plurality of product prior to a sorting and/or sequencing of the each of the plurality of product.

18. The computer program product of claim 12, wherein the computer program product is operable to determine an edge strength and remove noise prior to extraction thereby eliminating extraneous objects.

19. The computer program product of claim 12, wherein the computer program product is operable to build a database of the extracted one or more unique features for each of the plurality of product extracted prior to induction of the plurality of product into the system.

20. The computer program product of claim 19, wherein the computer program product identifies each of the product by the comparing the extracted one or more unique features stored in the database with the one or more unique features extracted during processing of the plurality of product in the system.

21. The computer program product of claim 19, wherein the computer program sorts and/or sequences the identified product.

22. A method of sorting and/or sequencing mail using extracted features, comprising:

extracting information from a plurality of mail piece prior to or during induction of the mail piece into a sorting and/or sequencing system using edge recognition techniques;

storing the extracted information from the plurality of mail piece in a data storage system; extracting the information from the plurality of mail pieces as they are being transported through the sorting and/or sequencing system using the edge recognition techniques;

comparing the stored extracted information with the extracted information extracted during the transport through the sorting and/or sequencing system;

identifying matches between the stored extracted information with the extracted information extracted during the transport through the sorting and/or sequencing system; and sorting the mail pieces that have been matched.

23. The method of claim 22, wherein the extracting uses a Gaussian smooth filtering.

24. The method of claim 22, further comprising eliminating noise prior to the extracting.

25. The method of claim 22, further comprising verifying the identified matches.

26. A computer program product comprising a computer usable storage medium having readable program code tangibly embodied in the storage medium, the computer program product being operable to:

extract one or more unique features for each of a plurality of product prior to induction of the plurality of product into a system and during processing of the plurality of product in the system;

compare the extracted one or more unique features for each of the plurality of product prior to or during induction with the extracted one or more unique features during processing of the plurality of product in the system; and identify each of the product based on a match in the comparing, wherein the computer usable storage medium is one of a diskette, hard disk, CD-ROM, DVD-ROM, tape, read-only memory (ROM) and random access memory (RAM).

27. A method comprising extracting and storing one or more unique features from each of a plurality of products and then identifying each of the products by matching the stored features with subsequently extracted unique features as the products are conveyed through a transportation system.

* * * * *